W. H. CLAUSEN.
VEHICLE WHEEL.
APPLICATION FILED JUNE 15, 1907.
919,826.
Patented Apr. 27, 1909.
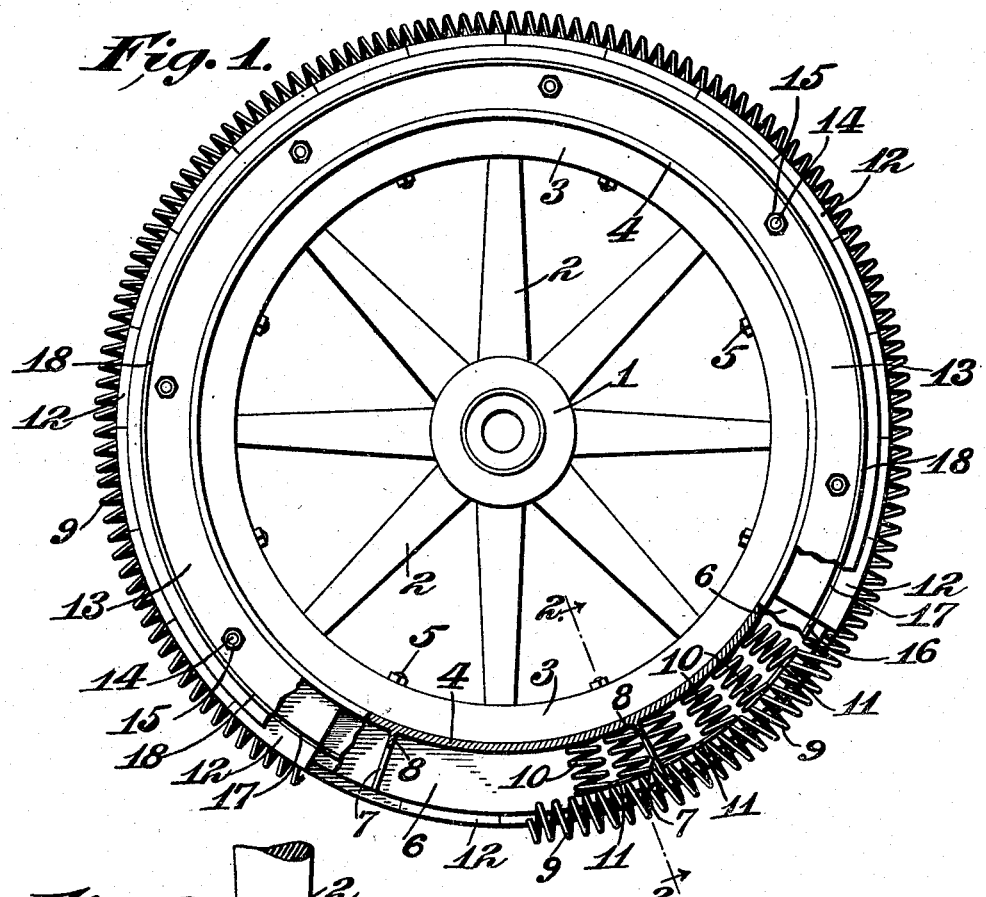
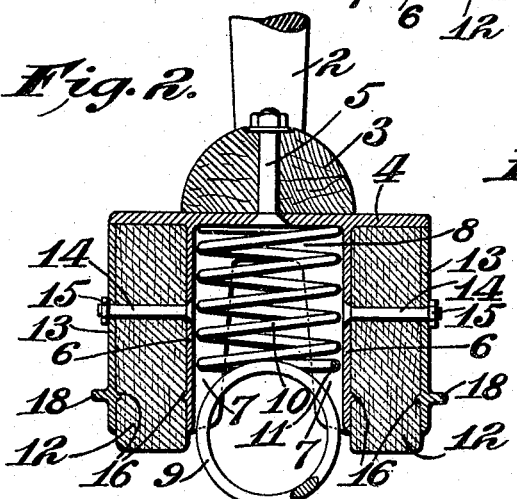
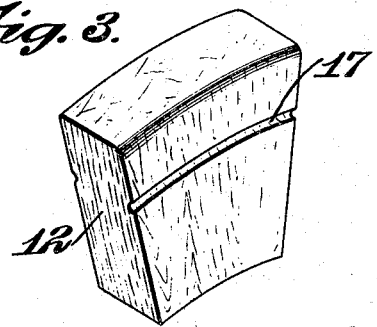
Witnesses:
G. A. Pennington
J. B. McGown
Inventor:
William H. Clausen
By Garrit Dam
Attys.

UNITED STATES PATENT OFFICE.

WILLIAM H. CLAUSEN, OF LUXEMBURG, MISSOURI.

VEHICLE-WHEEL.

No. 919,826.

Specification of Letters Patent.   Patented April 27, 1909.

Application filed June 15, 1907.  Serial No. 379,164.

To all whom it may concern:

Be it known that I, WILLIAM H. CLAUSEN, a citizen of the United States, and a resident of Luxemburg, county of St. Louis, and State of Missouri, have invented a new and useful Improvement in Vehicle-Wheels, of which the following is a specification.

This invention relates to vehicle wheels. It has for its principal objects to produce a simple, cheap and durable cushion tire for vehicle wheels; to provide a wheel with a resilient peripheral tread portion in conjunction with a sound-deadening semi-resilient tread portion; to provide a simple and efficient resilient tire possessing the necessary traction qualities; to produce an improved sound-deadening tread portion; and to attain certain other advantages hereinafter more fully appearing.

The invention consists in the parts and in the arrangements and combinations of parts hereinafter described and claimed.

In the accompanying drawings which form part of this specification and wherein like symbols refer to like parts wherever they occur, Figure 1 is a side elevation, partly in section and with portions removed, of a wheel embodying my invention; Fig. 2 is a section on line 2—2 of Fig. 1; and, Fig. 3 is a detail view of one of the segmental blocks.

The wheel may comprise any suitable hub 1 and any desirable arrangement of spokes 2. Preferably, a wooden rim or felly 3 is attached to the outer ends of the spokes 2. A flat metal rim 4 is secured on the periphery of the wooden felly 3 by bolts 5 or other suitable securing devices. It is obvious, however, that the wooden felly 3 may be dispensed with and the metal rim 4 arranged to receive the ends of the spokes. The metal rim 4 is provided with a pair of parallel peripheral flanges 6. These flanges are situated inwardly a short distance from the edges of the rim 4 and form a circumferential channel around the middle of said rim.

At regular intervals the flanges 6 are stiffened and braced by inwardly projecting ribs 7. Preferably, these ribs are joined integrally at their base portion by a web 8 projecting outwardly from the rim 4.

A continuous resilient band, preferably a helical spring 9 is mounted in the channel between the two flanges 6 centrally of the rim. This spring 9 is preferably arranged to normally project beyond the outer edges of said flanges 6, usually a distance equal to about one-half the diameter of said spring. Interposed between the circumferential spring 9 and the peripheral face of the rim 4 are a plurality of compression springs 10. These springs may be formed and mounted singly or in pairs and connected across at their ends as at 11 in Fig. 1. It is obvious, also, that the springs 10 may be formed of a continuous strand of wire if desired. The spring 9 is prevented from "creeping" or slipping by the ribs 7 which project between the coils thereof.

A plurality of segmental blocks 12 are mounted on the rim 4 and adapted to be clamped against the outer faces of the flanges 6 by circular plates 13. The plates are held at regular intervals by bolts 14 which have their heads countersunk into the flanges 6 and are passed through registering perforations in the respective blocks 12 at those points and through the perforations in said circular clamping plates to the outside where they receive nuts 15. The blocks 12 are prevented from slipping outwardly by annular ribs 16 on the adjacent faces of the flanges 6 and plates 13 which fit in counterpart grooves 17 formed in side faces of the blocks 12. The clamping plates 13 are provided with outwardly projecting annular ribs 18 which overhang the ends of the bolts 14 and prevent the nuts 15 from being knocked loose accidentally.

The segmental blocks 12 are made of semi-resilient or sound-deadening material. Preferably, they are made of wood and so arranged that the lines of the grain run substantially radially from the axis of the wheel. The blocks may be chemically treated in any well-known manner so as to withstand the action of the elements.

The segmental blocks when assembled in proper position project a short distance beyond the edges of the flanges 6 and clamping plates 13 and constitute the sustaining tread when the spring or resilient tread 9 yields. The spring 9 at all times presses outwardly, thereby offering tractive resistance whether the load is sustained directly by the spring or by the tread formed by the blocks 12. The wooden tread thus formed is noiseless on roughly paved streets and is also very durable.

Obviously the device admits of considerable modification within the scope of my invention and, therefore, I do not wish to be limited to the exact construction and arrangement herein shown.

What I claim as my invention and desire to secure by Letters Patent is:

1. A vehicle wheel having a rigid felly provided with a rigid tread portion and a resilient circumferential tread comprising an endless helical spring and cushion springs interposed between said circumferential spring and said rigid felly.

2. A vehicle wheel comprising a rigid felly having a tread portion comprising a plurality of segmental wooden blocks having the lines of the grain thereof extending substantially radially relative to the axis of the wheel, and a resilient tread adjacent to said wooden tread and extending normally beyond the same, said resilient tread comprising an endless circumferential helical spring and a plurality of cushion springs interposed between said circumferential spring and said rigid felly.

3. A vehicle wheel comprising a rigid felly having a circumferential channel, an endless circumferential helical spring loosely mounted in said channel and projecting normally outside thereof, a plurality of cushion springs interposed between said circumferential helical spring and the bottom of said channel.

4. A vehicle wheel comprising a rigid felly having a circumferential channel, an endless circumferential helical spring loosely mounted in said channel and projecting normally outside thereof, a plurality of cushion springs interposed between said circumferential spring and the bottom of said channel, and a tread comprising a plurality of wooden blocks arranged on said rigid felly so that the lines of the grain of said wooden blocks extend radially from the axis of the wheel.

5. A vehicle wheel comprising a metallic rim having a spaced parallel pair of circumferential flanges providing a median circumferential channel, said flanges having a series of oppositely disposed, inwardly projecting ribs, said ribs being formed integrally with radially projecting ribs on the peripheral face of said metallic rim, rigid annular tread members mounted on the marginal portions of the peripheral face of said metallic rim and secured to the adjacent circumferential flange thereon, and a resilient tread portion comprising an endless, open coil, helical spring mounted loosely between said circumferential flanges and projecting normally beyond the peripheries of said rigid tread members, and a series of springs interposed between said circumferential tread spring and said metallic rim.

Signed at St. Louis, Missouri, this 12th day of June, 1907.

WILLIAM H. CLAUSEN.

Witnesses:
G. A. PENNINGTON,
J. B. MEGOWN.